United States Patent
Maruyama

(10) Patent No.: US 10,152,334 B2
(45) Date of Patent: Dec. 11, 2018

(54) NETWORK BOOT SYSTEM

(71) Applicant: CO-CONV, Corp., Kyoto-shi, Kyoto (JP)

(72) Inventor: Shin Maruyama, Toyonaka (JP)

(73) Assignee: CO-CONV, CORP., Kyoto-Shi (JP)

(*) Notice: Subject to any disclaimer, the term of this patent is extended or adjusted under 35 U.S.C. 154(b) by 0 days.

(21) Appl. No.: 14/240,882

(22) PCT Filed: Jul. 8, 2013

(86) PCT No.: PCT/JP2013/068679
§ 371 (c)(1),
(2) Date: Feb. 25, 2014

(87) PCT Pub. No.: WO2014/010566
PCT Pub. Date: Jan. 16, 2014

(65) Prior Publication Data
US 2015/0120811 A1    Apr. 30, 2015

(30) Foreign Application Priority Data
Jul. 9, 2012 (JP) ................................. 2012-153195

(51) Int. Cl.
*G06F 9/44* (2018.01)
*G06F 9/4401* (2018.01)
*G06F 11/14* (2006.01)
*H04L 29/08* (2006.01)

(52) U.S. Cl.
CPC ........ *G06F 9/4416* (2013.01); *G06F 11/1456* (2013.01); *H04L 67/2857* (2013.01); *H04L 67/34* (2013.01)

(58) Field of Classification Search
CPC ... G06F 11/1456; H04L 67/34; H04L 67/2857
See application file for complete search history.

(56) References Cited

U.S. PATENT DOCUMENTS

| | | | |
|---|---|---|---|
| 6,857,057 B2 * | 2/2005 | Nelson | G06F 3/0613 711/162 |
| 2005/0125513 A1 * | 6/2005 | Sin-Ling Lam | G06F 9/44505 709/220 |

FOREIGN PATENT DOCUMENTS

WO    2009/145274 A1    12/2009

* cited by examiner

*Primary Examiner* — Chirag R Patel
(74) *Attorney, Agent, or Firm* — AEON Law, PLLC; Adam L. K. Philipp; David V. H. Cohen

(57) ABSTRACT

In a network boot system 100, a network boot server and a terminal 20a are connected through a network 30, the network boot server providing a disk image as a virtual disk 22a that includes an operating system operating on the terminal, the terminal 20a being provided with a physical storage device 21a. The operating system is provided with a read cache mechanism that stores data read from the server as cache data in the storage device. Further, the read cache mechanism is provided with generation management data for generation-managing a transition of revision that represents revise information of the virtual disk. The generation management data is divided for each transition of the revision and stored in the server and a copy of at least one division of the divided generation management data is also stored in the storage device.

8 Claims, 4 Drawing Sheets

Fig. 3A

Cache Management Table T1 of
Revision 11 (Rev. 11)

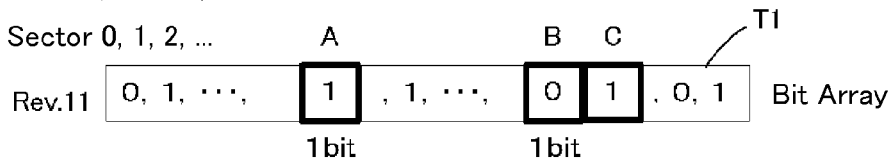

Sector A: Cache Done (Cache Management Flag: 1)
Sector B: Uncached (Cache Management Flag: 0)
Sector C: Cache Done (Cache Management Flag: 1)

Fig. 3B

Modified Region Map M3
of from Revision 8 (Rev. 8) → Revision 11 (Rev. 11)

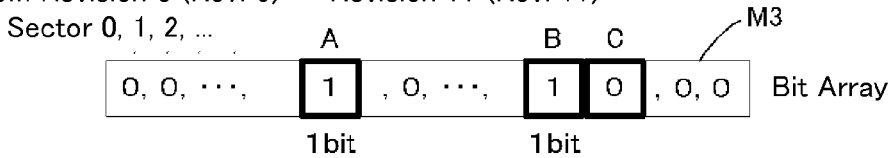

Sector A and Sector B Are Modified Regions,
Sector C Is Non-Modified Region
Modified Region: 1
Non-Modified Region: 0

Fig. 3C

Cache Management Table T2 of Revision 8 (Rev. 8)

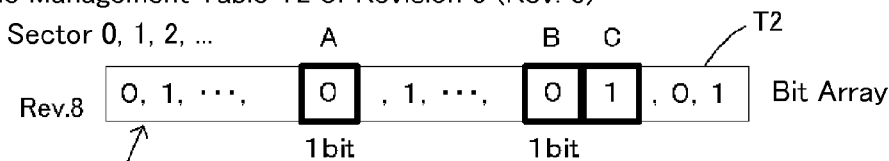

Sector A: Uncached (Cache Management Flag: 0)
Sector B: Uncached (Cache Management Flag: 0)
Sector C: Cache Done (Cache Management Flag: 1)

Logical AND between Cache Management Table T1
and Logical INVERT of Modified Region Map M3

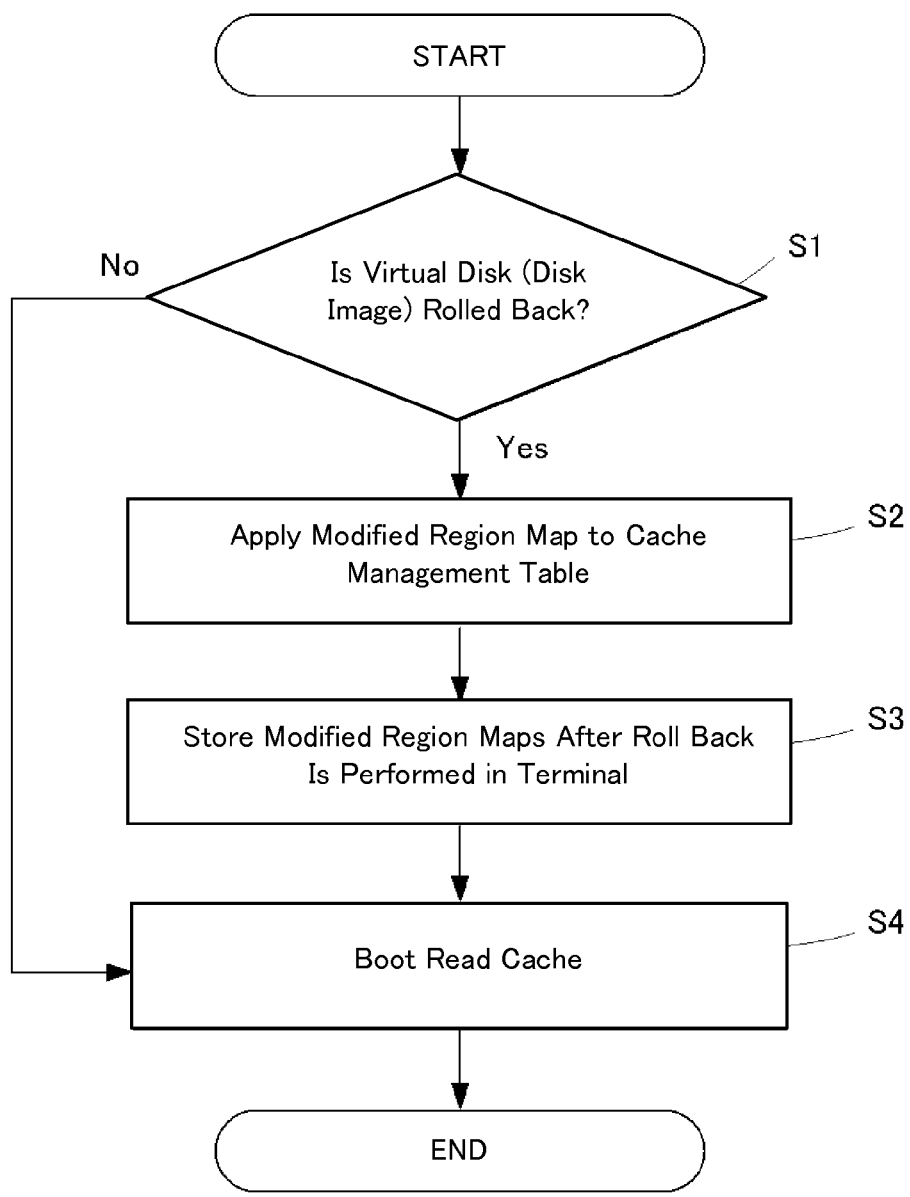

NETWORK BOOT SYSTEM

TECHNICAL FIELD

The present invention relates to a network boot system that boots an operating system through a network.

BACKGROUND

In recent years, it is generally known that, in a system (hereinafter referred to as a "network boot system") that boots an operating system (hereinafter referred to as an "OS") through a network, in order to reduce load on a network boot server, a read-only cache (hereinafter referred to as a "read cache mechanism") is provided in a part of a physical storage device on a client terminal side.

In Patent Document 1, a network boot system is disclosed in which a read cache mechanism is provided that can reduce network access to a network boot server by caching a virtual disk on the network boot server in a local disk of a PC (client terminal) that is used by an end user in the network boot system. The virtual disk is generation-managed using revise information (hereinafter referred to as "revision") and the revision is updated along with revision of the virtual disk such as installation of an updated program and a configuration change. The read cache mechanism has a cache management table corresponding to the revision of the virtual disk in each terminal and presence or absence of cache data is judged using the management table.

Further, the above-described network boot system further has a modified region map that indicates a correspondence relationship between a region of the virtual disk and a cache region. When the virtual disk is newly revised, the revision of the virtual disk is advanced from an old to a new revision and the modified region map indicating a modified cache region is applied to the cache management table. By using the management table, the read cache mechanism discards cache data corresponding to data that has been modified in the virtual disk and re-caches the data, and holds cache data corresponding to data that has not been modified as cache as is. When the virtual disk is newly modified and the revision is advanced in this way, the read cache mechanism can keep and effectively utilize a large portion of the cache. In such a network boot system, even when a large number of client terminals are booted all at once, for a second or subsequent booting, there is almost no access to the network and the client terminals can be booted at high speeds.

RELATED PRIOR ART

Patent Document(s)

[Patent Document 1] International Publication No. WO 09-145274.

SUMMARY

Subject(s) To Be Solved

However, in the above-described conventional network boot system, when the virtual disk (a disk image on the server) is rolled back in order to return to a past state, specifically, a past revision, consistency between the rolled back virtual disk and the cache data on the terminal side cannot be maintained and the cache data cannot be utilized. Therefore, in the above-described read cache mechanism, all the cache data is discarded and the rolled back virtual disk is re-cached. However, there is a problem that, when a large number of terminals are booted all at once after the virtual disk is rolled back, a number of network accesses to the server from the terminals is large and loads are concentrated on the server so that boot speeds of the terminals decrease.

The present invention has been made in view of the above-described circumstances and a main technical subject of the present invention is that, in a network boot system that is provided with a read cache mechanism, even when a large number of terminals are booted all at once after a virtual disk is rolled back, decrease in boot speeds of the terminals is suppressed.

Means for Solving Subject(s)

A network boot system relates to the present invention includes a client terminal that has a physical storage device, a network boot server that provides a disk image as a virtual disk, the disk image including an operating system (OS) operating on the client terminal. Wherein, the operating system is provided with a read cache mechanism that stores data read from the server in the storage device as cache data, the read cache mechanism is provided with generation management data for generation-managing a transition of a revision that represents revise information of the virtual disk, and the generation management data is divided for each transition of revision and stored in the server, and a copy of at least one division of the divided generation management data is also stored in the storage device. The generation management data is data that indicates which region of the virtual disk has been modified by the transition of the revision of the virtual disk (disk image). A region where cache data is modified is known by associating a region of the virtual disk with a region where the cache data is stored.

According to this configuration, even when the virtual disk (disk image on the server) is revised or rolled back, by using the copy of the generation management data stored in the storage device of the terminal, the read cache mechanism can reduce network access from the terminal to the server and suppress decrease in the boot speed of the terminal.

It is preferred that the cache data has a revision of cache that corresponds to the revision that represents the revise information of the virtual disk, and the copy is generation management data that is up to the revision of the cache. For example, when the revision of the virtual disk and the revision of the cache are the same, the generation management data of up to a revision 11 of the cache is data that indicates which region of the virtual disk is modified when the virtual disk has transitioned from some revision to the revision 11. Further, the copy of the generation management data that is stored in the storage device may include data between two different revisions to which the revision of the virtual disk corresponding to the revision of the cache has transitioned. In any case, by using the copy of the generation management data stored in the storage device, the difference between generations of the virtual disk up to the revision of the cache can be obtained.

Further, it is preferred that the read cache mechanism is provided with a cache management table that indicates presence or absence of cache data; a means for generating the cache management table, when the virtual disk has been rolled back, by selecting generation management data, which is from a rolled back revision of the virtual disk to a revision of the virtual disk corresponding to a revision of the cache, as generation management data at the roll back time from the copy, and by applying the generation management data at the roll back time to a cache management table before the roll back time; and a means for storing the generation management data up to the rolled back revision of the virtual disk in the storage device. As a result, by using the cache management table that is generated when roll back is performed, the read cache mechanism can suppress the amount of discarded cache data and effectively utilize the cache data. Further, by storing the generation management data of up to the revision to which the virtual disk is rolled back in the storage device of the terminal, even when the virtual disk is further rolled back, the generation management data can be used to effectively utilize the cache data.

The cache management table before the roll back time is a bit array that represents a region where cache data is present and a region where cache data is absent, the generation management data at the roll back time is a bit array that represents a region that is modified and a region that is not modified, and the cache management table is calculated by a logical operation between the cache management table before the roll back time and the generation management data at the roll back time. For example, when the cache management table is a bit array formed with bits for regions where cache data is present are set to 1 and bits for regions where cache data is absent are set to 0, and the generation management data that is defined when the roll back is performed (or at the roll back time) is a bit array in which bits for regions that are modified are set to 1 and bits for regions that are not modified are set to 0, the cache management table can be obtained by calculating a logical AND between the cache management table and a logical INVERT of the generation management data at the roll back time.

The read cache mechanism may be booted by following steps:

(a) comparing a revision that represents revise information of the virtual disk with a revision of the virtual disk corresponding to the cache data;

(b) when the revision that represents the revise information of the virtual disk is older than the revision of the virtual disk corresponding to the cache data, selecting, from the copy, the generation management data of from the revision that represents the revise information of the virtual disk to the revision of the virtual disk corresponding to the cache data as generation management data before and after the modification;

(c) storing, in the terminal, the generation management data of up to the revision that represents the revise information of the virtual disk; and (d) operating read cache using the generation management data before and after the modification in order not to use cache data that has been modified.

A network boot server, which relates to the present invention, that provides a disk image as a virtual disk that includes an operating system operating on a client terminal to the terminal through a network. Wherein the operating system is provided with a read cache mechanism that stores data read from the server as cache data, and the server has generation management data that is for generation-managing a transition of revision that represents revise information of the virtual disk and of which a copy is also stored in the terminal A client terminal, which relates to the present invention, in a network boot system, the client terminal being connected through a network to a network boot server that provides a disk image as a virtual disk that includes an operating system operating on the client terminal. Wherein the operating system is provided with a read cache mechanism that stores data read from the server as cache data in a storage device, and the terminal has a copy of generation management data for generation-managing a transition of revision that represents revise information of the virtual disk that is stored in the server.

By using the server or terminal of the above network boot system to configure a network boot system, the read cache mechanism can suppress decrease in the boot speed of the terminal by using the copy of the generation management data stored in the terminal to reduce network access from the terminal to the server.

A boot procedure of a read cache mechanism of a network boot system in which a network boot server and a client terminal are connected through a network, the network boot server providing a disk image as a virtual disk that includes an operating system operating on the client terminal, the operating system is provided with a read cache mechanism that stores data read from the server as cache data in the terminal, the read cache mechanism is provided with generation management data for generation-managing a transition of revision that represents revise information of the virtual disk. The boot procedure includes a step of comparing a revision that represents the revise information of the virtual disk with a revision of the virtual disk corresponding to the cache data; a step of, when the revision that represents the revise information of the virtual disk is older than the revision of the virtual disk corresponding to the cache data, selecting, from the generation management data, the generation management data of from the revision that represents the revise information of the virtual disk to the revision of the virtual disk corresponding to the cache data as generation management data before and after the modification; a step of storing the generation management data of up to the revision that represents the revise information of the virtual disk in the terminal; and a step of operating read cache by using the generation management data before and after the modification in order not to use the cache data that has been modified.

Advantage(s) of Invention

In the network boot system according to the present invention, even after the virtual disk is rolled back, by using the copy of the generation management data stored in the storage device of the terminal, network access from the terminal to the server can be reduced and decrease in the boot speed of the terminal can be suppressed.

BRIEF DESCRIPTION OF DRAWINGS

FIGS. 3A-3C illustrate conceptual diagrams describing a cache management table to which a modified region map is applied in the network boot system of the present embodiment: FIG. 3A illustrates an example of a cache management table of a revision 11; FIG. 3B illustrates an example of a modified region map of from a revision 8 to the revision 11; and FIG. 3C illustrates an example of a cache management table of the revision 8.

FIG. 4 illustrates a flow diagram illustrating an example of a flow in which a read cache mechanism applies a modified region map to a cache management table in the network boot system of the present embodiment.

DETAILED DESCRIPTIONS OF EMBODIMENTS

Figure 1:
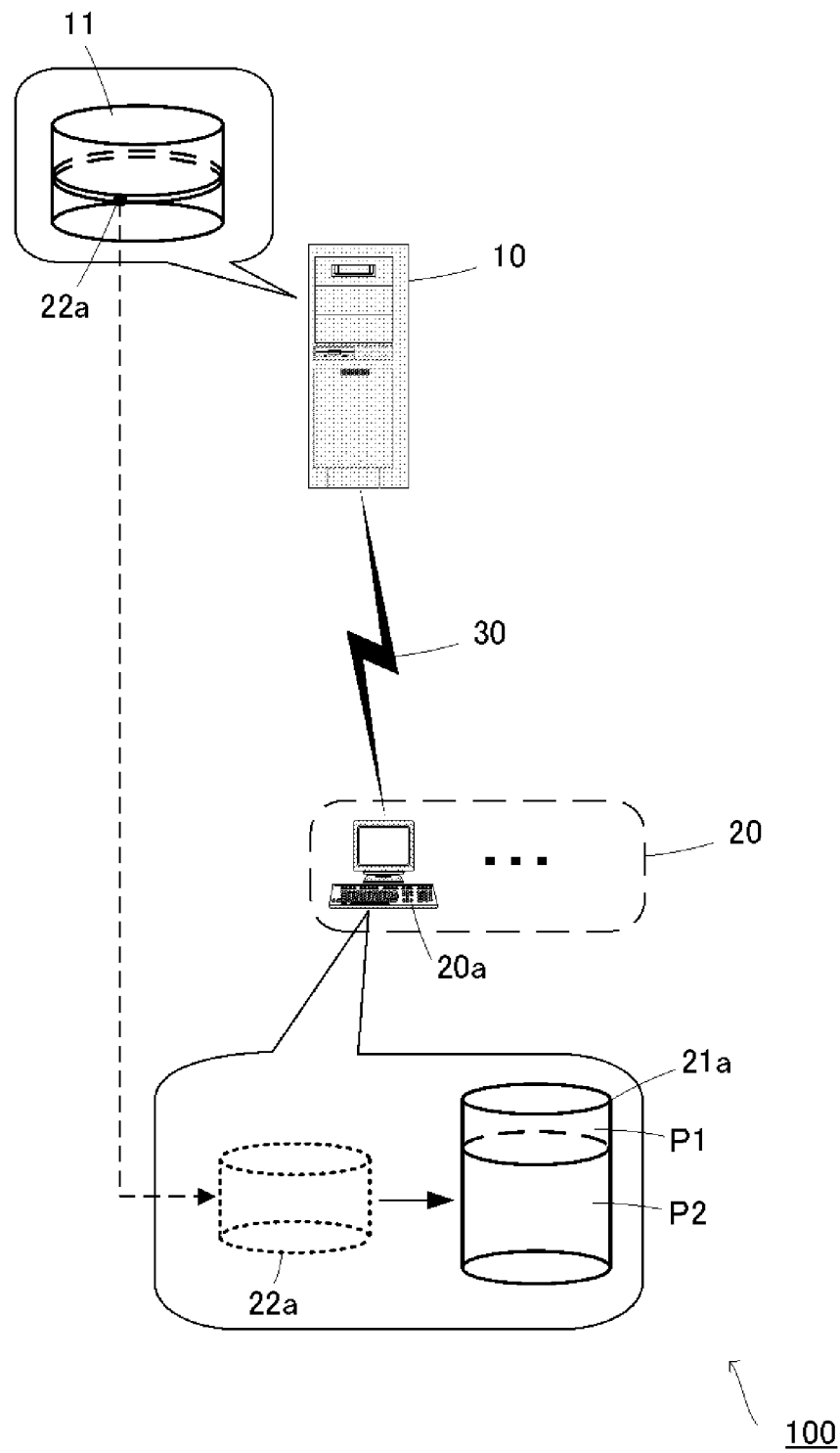
FIG. 1 illustrates a conceptual diagram for describing a basic configuration of a network boot system of the present embodiment.

Hereinafter, a network boot system related to the present invention is described in detail referring to the drawings. First, one embodiment of the network boot system provided with a read cache mechanism according to the present invention is exemplarily explained. Descriptions for each embodiment should be purposefully interpreted in order to understand a technical thought of the present invention. The thought should not be limited with the descriptions of these embodiments.

(1) Overall Configuration of Network Boot System

FIG. 1 illustrates a conceptual diagram for describing a basic configuration of a network boot system of the present embodiment. As illustrated in FIG. 1, in a network boot system 100, a server 10 and a plurality of client terminals 20 (20a, . . . ) are connected through a network 30. The server 10 is provided with a physical disk 11. The client terminal 20a is provided with a physical disk 21a as a physical storage device and a virtual disk 22a. The server 10 and the client terminal 20a are each provided with basic configuration elements such as a CPU and a physical memory (which are not illustrated in the drawings). A disk image 22a of an OS that is read when each of the client terminals 20 (20a, . . . ) is initially booted is stored in the physical disk 11. Here, the term "physical disk" refers to a storage means such as a hard disk and other devices that are tangible. The physical disk 21a has a first partition P1 that is recognized at a logical level and a second partition P2 that is recognized at a physical level. Mainly a read cache region and a cache management region are allocated in the second partition P2.

As a basic operation of the client terminal 20a, a filter driver of the terminal 20a converts a read and write access to the physical disk 21a into a network access and, with this conversion, the CPU of the terminal 20a uses a network interface to access the disk image 22a on the server 10 connected through the network instead of accessing the physical disk 21a. The client terminal 20a is provided with a read cache driver for causing a read cache mechanism to function. The read cache driver is a program and mainly performs data access (write and read) with respect to the read cache region in the physical disk 21a. The read cache driver functions to read-cache data read from the server 10 by storing the data as cache in the read cache region on the physical disk 21a. The read cache region is in one-to-one association with the disk image 22a. It is also possible to perform in such a manner that, by using a management flag, cache data that has been written at least once after being cached is not used.

Figure 2:
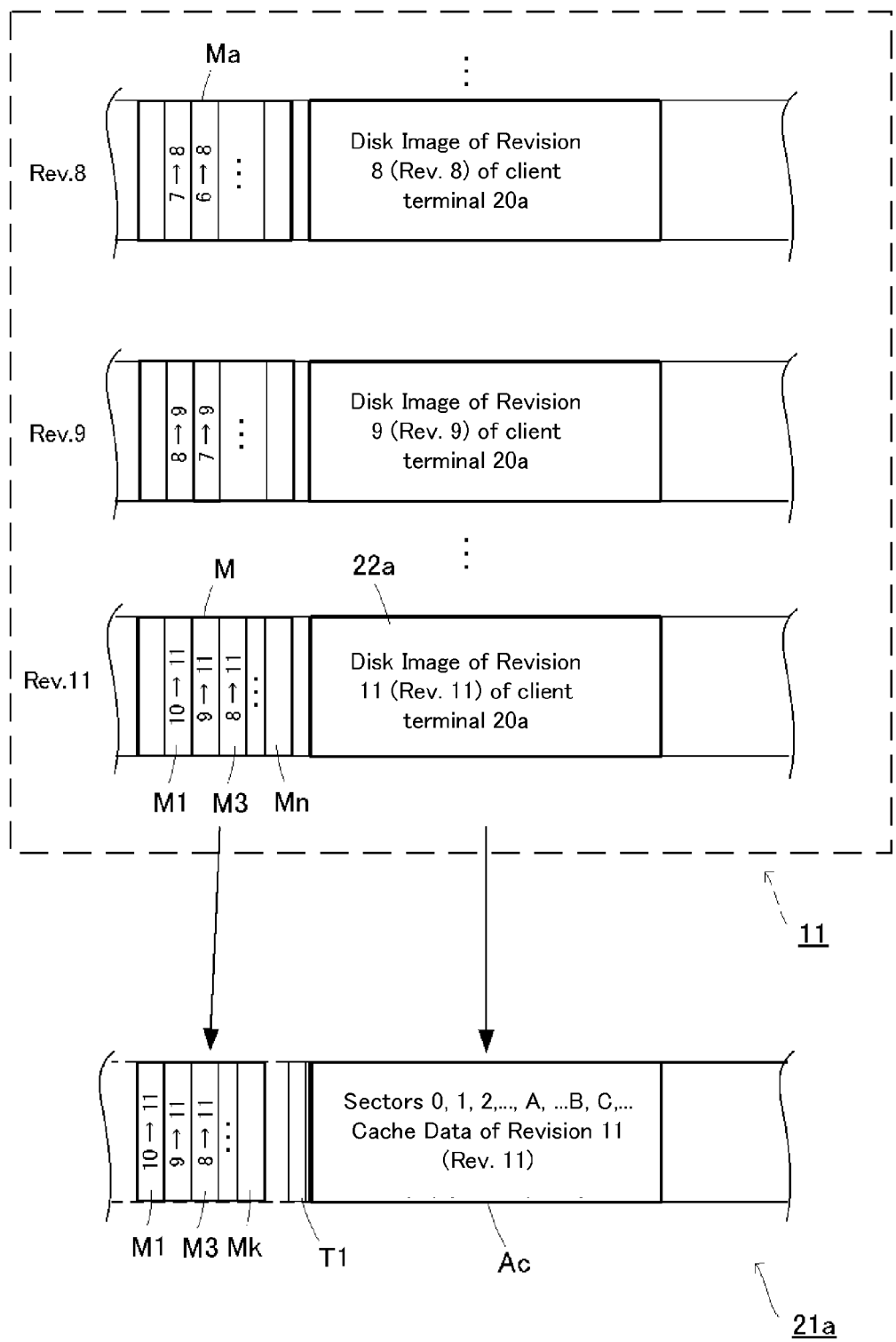
FIG. 2 illustrates a conceptual diagram for describing a modified region map of the network boot system of the present embodiment.

FIG. 2 illustrates a conceptual diagram for describing a modified region map of the network boot system of the present embodiment. As illustrated in FIG. 2, on the physical disk 11 of the server 10, disk images of the client terminal 20a that are managed for respective revisions ( . . . , Rev. 8, Rev. 9, . . . , Rev. 11) and modified region maps as generation management data of the disk images are stored. For example, the disk image 22a of a revision 11 of the client terminal 20a and modified region maps M1, . . . , Mn (where n is a positive integer) as the generation management data of the disk image 22a are stored. Further, on the physical disk 21a of the terminal 20a, cache data that is read by the above-described read cache driver, a cache management table T1 of the revision 11, and modified region maps M1, . . . , Mk (where k is a positive integer equal to or less than n) are stored.

The cache management table T1 of the revision 11 is data that indicates whether or not cache data of the disk image 22a of the revision 11 exists in a read cache region Ac, and is, for example, a bit array that respectively uses 1 to indicate a region (sector) where cache data is present and 0 to indicate a region where cache data is absent. The cache management table T1 of the revision 11 manages the cache data of the revision 11. The cache data of the revision 11 is associated with the disk image 22a of the revision 11. The cache management table T1 is read to the physical memory of the terminal 20a and is regularly written back to the cache management region.

All the modified region maps M1, . . . , Mk are generation management data for generation-managing a transition of the revisions of the virtual disk 22a (the disk image 22a of the server 10) of the terminal 20a, and are data that indicates data of which region in the disk image 22a is modified between two different revisions. The modified region maps M1, . . . , Mk are obtained by copying one or a plurality of the modified region maps M1, . . . , Mn on the physical disk 11 of the server 10, and are a bit array that, for example, uses 1 to indicate a region that is modified based on the disk image 22a of the revision 11 and 0 to indicate a region that is not modified.

Even when the disk image 22a on the server 10 side is revised or rolled back to a revision different from the revision 11, by applying the modified region maps M1, . . . , Mk stored in the terminal 20a side to the cache management table T1 of the revision 11, the read cache mechanism can identify a region where the disk image 22a is not modified, that is, a region where the cache data can be utilized as is, and can effectively utilize the cache data. As a result, network access from the terminal to the server can be reduced and decrease in the boot speed of the terminal can be suppressed. Next, a method for applying the modified region maps to the cache management table is described.

FIGS. 3A-3C illustrate conceptual diagrams describing a cache management table to which a modified region map is applied in the network boot system of the present embodiment. FIG. 3A illustrates an example of a cache management table of the revision 11; FIG. 3B illustrates an example of a modified region map of from the revision 8 to the revision 11; and FIG. 3C illustrates an example of a cache management table of the revision 8.

As illustrated in FIG. 3A, in the cache management table T1 of the revision 11, a bit for a sector A is set to 1, a bit for a sector B is set to 0, and a bit for a sector C is set to 1. This indicates that data of the disk image 22a of the revision 11 is already stored (cache done) as cache data at the sectors A and C of the read cache region of the terminal 20a, and that cache data is absent (uncached) at the sector B. By referencing the cache management table T1 of the revision 11, the read cache mechanism can access the cache data of a cache done sector and, when data corresponding to an uncached region in the disk image 22a of the revision 11 is read, can store the date as cache data.

As illustrated in FIG. 3B, in a modified region map M3 of from the revision 8 to the revision 11, a bit for the sector A is set to 1, a bit for the sector B is set to 1, a bit for the sector C is set to 0, and bits for other sectors are set to 0. This indicates that, when the disk image 22a is revised from the revision 8 to the revision 11, the sectors A and B of the read cache region are regions (modified regions) that are revised along with the revision of the disk image 22a, and that the sector C and other sectors are regions (non-modified regions) that are not modified.

The modified region map only indicates a read cache region corresponding to a modified region of the disk image (virtual disk) 22a, for example, a sector in a hard disk, and does not hold any information about content of data in the region. Therefore, a capacity size of the modified region map can be much smaller than a size of the disk image 22a. For example, using a recording unit of a current hard disk and the like as an example, when data of 512 bytes is stored in one sector, since it is 1 bit per 512 bytes (=4096 bits), it is understood that the size of the modified region map capacity may be only $1/4096$ (=1 bit/512 bytes) of the capacity of the virtual disk.

The size of one modified region map is, for example, about 5 Mbytes for a hard disk of about 21 Gbytes. However, when the modified region map is compressed using a run-length compression method, its size is about 3.2-6.4 Kbytes or even smaller. Therefore, when a plurality of the compressed modified region maps are stored in the physical disk 21a of the terminal 20a and the modified region maps are used to effectively utilize cache data, network load can be significantly reduced as compared with the case where the respective regions of the disk image 22a are re-stored as cache in the terminal. The compression of the modified region maps described above may be performed on the server side or on the terminal side.

As illustrated in FIG. 3C, in the cache management table T2 of the revision 8, a bit for the sector A is set to 0, a bit for the sector B is set to 0, and a bit for the sector C is set to 1. This indicates that cache data is absent (uncached) at the sectors A and B of the read cache region of the terminal 20a and that data of the disk image 22a of the revision 8 is already stored (cache done) as cache data at the sector C of the read cache region of the terminal 20a. The cache management table T2 of the revision 8 can be obtained by extracting the modified sectors A and B of the read cache region in the modified region map M3 of from the revision 8 to the revision 11 and setting the bits for the sectors A and B of the cache management table T1 of the revision 11 to 0 (uncached state), that is, by calculating a logical AND between the cache management table T1 and a logical INVERT of the modified region map M3. When the cache management table T2 of the revision 8 is used, the revision of the cache data is changed from the revision 11 to the revision 8. Further, in this case, by storing a modified region map Ma of the revision 8 that is illustrated in FIG. 2 in the storage device 21a of the terminal 20a, a cache management table can be similarly calculated even when the disk image 22a is further rolled back from the revision 8.

Even when the disk image 22a is rolled back from the revision 11 to the revision 8, by referencing the cache management table T2 of the revision 8 to newly re-cache the cache data of the revision 11 of the sectors A and B that have been modified and to use the cache data of the revision 11 that has not been modified as the cache data of the revision 8, the read cache mechanism can suppress amount of the cache data of the revision 11 that is to be discarded and effectively utilize the cache data of the revision 11.

In the network boot system of the present embodiment, after the virtual disk is rolled back, the amount of the cache data, which is discarded by applying a modified region map (that is stored in the storage device of the terminal) of from a revision after the roll back is performed to a revision before the roll back time to a cache management table, is suppressed, and the cache data is effectively utilized. Thereby, the network access from the terminal to the server can be reduced. Therefore, even when a large number of terminals are booted all at once after the virtual disk is rolled back, decrease in boot speeds of the terminals can be suppressed.

FIG. 4 illustrates a flow diagram illustrating an example of a flow in which a read cache mechanism applies a modified region map to a cache management table in the network boot system of the present embodiment. In the following description, the revision of the cache data and the revision of the disk image corresponding to the revision of the cache data are assumed to be the same. First, the revision of the disk image on the server and the revision of the cache data are compared with each other (S1). When the revision of the disk image on the server is older than the revision of the cache data, the disk image on the server has been rolled back. Therefore, among the modified region maps that are stored in the terminal, specifically, the modified region map of from the revision of the disk image that is rolled back to the revision of the cache data is selected and the modified region map is applied to the cache management table to generate a new cache management table (S2). In this case, the revision of the cache data is modified according to the revision of the disk image that has been rolled back. Modified region maps up to the revision of the disk image that has been rolled back are included in the disk image that has been rolled back. Therefore, these modified region maps are stored in the physical disk of the terminal (S3). S3 may be performed at any timing, and may be performed when the disk image on the server is revised and the modified region map on the server is updated. Thereafter, the new cache management table is used to boot the read cache while avoiding using the cache data that has been modified (S4). For example, in the cache management table, a region of the cache data that has been modified is represented using a flag (0) that indicates a state in which cache is absent, and the read cache is booted in a manner that the region of the cache data corresponding to the flag is not utilized. The read cache mechanism is provided with a program that processes the above steps. Thereby, even when the disk image on the server is rolled back, the read cache mechanism can effectively utilize the cache data stored in the terminal In the network boot system of the present embodiment, even when the disk image on the server side is revised or rolled back, by applying the modified region map stored on the terminal side to the cache management table, the read cache mechanism can identify a region of the cache data that corresponds to a region that is not modified by the revision or the roll back, that is, a region that can be used as is as cache data in the current revision, and effectively utilize the cache data without discarding the cache data corresponding to the region. As a result, network access to the server can be reduced and decrease in the boot speed of the terminal can be suppressed.

In the network boot system of the present embodiment, the modified region map is stored in the physical disk of the terminal. However, the modified region map may also be stored in a region that can be accessed without causing a large network load when the terminal is booted, for example, in a medium such as an external storage and a USB memory. Further, the modified region map is for modification up to the revision of the cache data. However, the modified region map may also include revisions of the virtual disk corresponding to the revisions of the cache data between respective revisions. For example, even for a modified region map of from the revision 8 to a revision 12, similar to the above, by applying the modified region map to the cache management table of the revision 11 to generate the cache management table of the revision 8, cache data of the revision 11 can be effectively utilized as cache data of the revision 8.

EXPLANATION OF REFERENCES

10: server (network boot server)
11: physical disk (hard disk)
20: client terminals
20a: client terminal
21a: disk
22a: virtual disk (vDisk)
23a: physical memory
30: network
100: network boot system
Ac: read cache region
M, Ma: modified region map
T1, T2: cache management table

The invention claimed is:

1. A network boot system, comprising:
a client terminal that has a physical storage device,
a network boot server that provides a disk image as a virtual disk, the disk image including an operating system (OS) operating on the terminal, the virtual disk being segmented by a plurality of regions, wherein
the operating system is provided with a read cache mechanism that stores data read from the server in the storage device of the terminal as cache data,
the read cache mechanism is provided with generation management data for generation-managing a transition of a revision that represents revise information of the virtual disk, the generation management data only indicating which region of the virtual disk has been modified by the transition of the revision without holding any information about content of data, and
the generation management data is divided for each transition of revision and stored in the sever, and
a copy of at least one division of the divided generation management data is also stored in the storage device,
wherein the read cache mechanism is provided with a cache management table that indicates presence or absence of cache data;
a means for holding the cache management table, when the virtual disk has been rolled back, by selecting generation management data, which is from a rolled back revision of the virtual disk to a revision of the virtual disk corresponding to a revision of the cache, as generation management data at the roll back time from the copy, and by applying the generation management data at the roll back time to a cache management table before the roll back time; and
a means for storing the generation management data up to the rolled back revision of the virtual disk in the storage device.

2. The network boot system according to claim 1, wherein
the cache data has a revision of cache that corresponds to the revision that represents the revise information of the virtual disk, and
the copy is generation management data that is up to the revision of the cache.

3. The network boot system according to claim 1, wherein
the cache management table before the roll back time is a bit array that represents a region where cache data is present and a region where cache data is absent,
the generation management data at the roll back time is a bit array that represents a region that is modified and a region that is not modified, and
the cache management table is calculated by a logical operation between the cache management table before the roll back time and the generation management data at the roll back time.

4. The network boot system according to claim 1, wherein the read cache mechanism is booted by the following steps:
(a) comparing a revision that represents the revise information of the virtual disk with a revision of the virtual disk corresponding to the cache data;
(b) when the revision that represents the revise information of the virtual disk is older than the revision of the virtual disk corresponding to the cache data, selecting, from copy, the generation management data of from the revision that represents the revise information of the virtual disk to the revision of the virtual disk corresponding to the cache data as generation management data before and after the modification;
(c) storing, in the terminal, the generation management data of up to the revision that represents the revise information of the virtual disk in the terminal; and
(d) operating read cache by using the generation management data before and after the modification in order not to use the cache data that has been modified.

5. A network boot server that provides a disk image as a virtual disk that includes an operating system operating on a client terminal having a storage device to the terminal through a network, the virtual disk being segmented by a plurality of regions, wherein
the operating system is provided with a read cache mechanism that stores data read from the server as cache data, and
the server has generation management data that is for generation-managing a transition of revision that represents revise information of the virtual disk, the generation management data only indicating which region of the virtual disk has been modified by the transition of the revision, and not holding any content of data, and of which a copy is also stored in the terminal, causing the terminal to boot using the copy of the generation management data,
wherein the read cache mechanism is provided with a cache management table that indicates presence or absence of cache data;
a means for holding the cache management table, when the virtual disk has been rolled back, by selecting generation management data, which is from a rolled back revision of the virtual disk to a revision of the virtual disk corresponding to a revision of the cache, as generation management data at the roll back time from the copy, and by applying the generation management data at the roll back time to a cache management table before the roll back time; and
a means for storing the generation management data up to the rolled back revision of the virtual disk in the storage device.

6. A client terminal in a network boot system, the terminal having a storage device and being connected through a network to a network boot server that provides a disk image as a virtual disk that includes an operating system operating on the terminal, the virtual disk being segmented by a plurality of regions wherein
the operating system is provided with a read cache mechanism that stores data read from the server in the storage device of the terminal as cache data, and the terminal has a copy of generation management data for generation-managing a transition of revision that represents revise information of the virtual disk that is stored in the server, the generation management data only indicating which region of the virtual disk has been modified by the transition of the revision without holding any information about content of data and the terminal is booted using the copy of generation management data, wherein the read cache mechanism is provided with a cache management table that indicates presence or absence of cache data;

a means for holding the cache management table, when the virtual disk has been rolled back, by selecting generation management data, which is from a rolled back revision of the virtual disk to a revision of the virtual disk corresponding to a revision of the cache, as generation management data at the roll back time from the copy, and by applying the generation management data at the roll back time to a cache management table before the roll back time; and a means for storing the generation management data up to the rolled back revision of the virtual disk in the storage device.

7. A boot procedure of a read cache mechanism of a network boot system in which a network boot server and a client terminal are connected through a network, the network boot server providing a disk image as a virtual disk that includes an operating system operating on the terminal, the virtual disk being segmented by a plurality of regions, the operating system is provided with a read cache mechanism that stores data read from the server as cache data in the terminal, the read cache mechanism is provided with generation management data for generation-managing a transition of revision that represents revise information of the virtual disk, the generation management data only indicating which region of the virtual disk has been modified by the transition of the revision without holding any information about the content of data, the boot procedure comprising:

a step of comparing a revision that represents the revise information of the virtual disk with a revision of the virtual disk corresponding to the cache data;

a step of, when the revision that represents the revise information of the virtual disk is older than the revision of the virtual disk corresponding to the cache data, selecting, from the generation management data, the generation management data of from the revision that represents the revise information of the virtual disk to the revision of the virtual disk corresponding to the cache data as generation management data before and after the modification;

a step of storing the generation management data of up to the revision that represents the revise information of the virtual disk in the terminal; and a step of operating read cache by using the generation management data before and after the modification in order not to use the cache data that has been modified, wherein the read cache mechanism is provided with a cache management table that indicates presence or absence of cache data, and the step of operating the read cache newly generates a cache management table by applying the generation management data before and after the modification to the cache management table and operates the read cache by reference the newly generated cache management table in order not to use cache data of a region where the cache data is absent.

8. The boot procedure of the read cache mechanism according to claim 7, wherein the cache management table is a bit array that represents a region where cache data is present and a region where cache data is absent, the generation management data before and after modification is a bit array that represents a region that is modified and a region that is not modified, and the step of newly generating the cache management table performs a logical operation between the cache management table and the generation management data before and after modification.

* * * * *